(12) United States Patent
Cao et al.

(10) Patent No.: US 10,163,220 B2
(45) Date of Patent: Dec. 25, 2018

(54) EFFICIENT HYBRID METHOD FOR EGO-MOTION FROM VIDEOS CAPTURED USING AN AERIAL CAMERA

(71) Applicant: HRL Laboratories, LLC, Malibu, CA (US)

(72) Inventors: Yongqiang Cao, Newton, MA (US); Narayan Srinivasa, Portland, OR (US); Shankar R. Rao, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/585,032

(22) Filed: May 2, 2017

(65) Prior Publication Data

US 2018/0225833 A1   Aug. 9, 2018

Related U.S. Application Data

(63) Continuation-in-part of application No. 15/250,665, filed on Aug. 29, 2016.
(Continued)

(51) Int. Cl.
*G06T 7/20* (2017.01)
*G06K 9/00* (2006.01)
(Continued)

(52) U.S. Cl.
CPC ............ *G06T 7/246* (2017.01); *G06K 9/3241* (2013.01); *G06T 7/73* (2017.01); *G06K 2209/23* (2013.01);
(Continued)

(58) Field of Classification Search
CPC .. G06T 7/20; G06T 7/254; G06T 7/70; G06T 7/97; G06K 9/00624; G06K 9/0063; G06K 9/00711; G06K 9/00771
See application file for complete search history.

(56) References Cited

U.S. PATENT DOCUMENTS 6,307,959 B1    10/2001  Mandelbaum et al. ...... 382/154
2011/0074927 A1  3/2011  Perng et al. .................... 348/46
(Continued)

FOREIGN PATENT DOCUMENTS

WO        WO0139120 A2    5/2001

OTHER PUBLICATIONS

H. Badino and T. Kanade, "A Head-Wearable Short-Baseline Stereo System for the Simultaneous Estimation of Structure and Motion," in Proc. 12th IAPR Conference on Machine Vision Applications (MVA), Jun. 2011, pp. 1-5.
(Continued)

*Primary Examiner* — Andrew W Johns
(74) *Attorney, Agent, or Firm* — Tope-McKay & Associates (57) ABSTRACT

Described is a system for compensating for ego-motion during video processing. The system generates an initial estimate of camera ego-motion of a moving camera for consecutive image frame pairs of a video of a scene using a projected correlation method, the camera configured to capture the video from a moving platform. An optimal estimation of camera ego-motion is generated using the initial estimate as an input to a valley search method or an alternate line search method. All independent moving objects are detected in the scene using the described hybrid method at superior performance compared to existing methods while saving computational cost.

15 Claims, 6 Drawing Sheets

Related U.S. Application Data (60) Provisional application No. 62/210,630, filed on Aug. 27, 2015, provisional application No. 62/330,462, filed on May 2, 2016, provisional application No. 62/330,518, filed on May 2, 2016, provisional application No. 62/500,071, filed on May 2, 2017.

(51) Int. Cl.
*G06T 7/246* (2017.01)
*G06T 7/73* (2017.01)
*G06K 9/32* (2006.01)

(52) U.S. Cl.
CPC .............. *G06T 2207/10016* (2013.01); *G06T 2207/30244* (2013.01); *G06T 2207/30252* (2013.01)

(56) References Cited

U.S. PATENT DOCUMENTS

| | | | |
|---|---|---|---|
| 2013/0028472 A1* | 1/2013 | Pham | 382/103 |
| 2013/0070962 A1 | 3/2013 | Yankun et al. | 382/103 |
| 2015/0086078 A1* | 3/2015 | Sibiryakov | G06K 9/00791 382/104 |
| 2015/0293138 A1 | 10/2015 | Briod et al. | G01P 3/36 |

OTHER PUBLICATIONS

Y. Cheng, M. Maimone, and L Matthies, "Visual odometry on the Mars exploration rovers," in IEEE International Conference on Systems, Man and Cybernetics, vol. 1, pp. 903-910, 2005.
C.R. del-Blanco, F. Jaureguizar, L. Salgado, and N. Garcia, "Motion estimation through efficient matching of a reduced number of reliable singular points," in Proc. SPIE Electronic Imaging 2008, vol. 6811, pp. 68110N 1-12, 2008.
L. Itti, Neovision2 annotated video datasets. Taken on Jun. 15, 2017 from h t t p: / / ilab.usc.edu/neo2/dataset/.
B.D. Lucas and T. Kanade, "An iterative image registration technique with an application to stereo vision," in Proc. 7th International Joint Conference on Artificial Intelligence (IJCAI), vol. 81, pp. 674-679, 1981.
S. Baker and I. Matthews, "Lucas-kanade 20 years on: A unifying framework," International Journal of Computer Vision, vol. 56, No. 3, pp. 221-255, 2004.
M. Irani, B. Rousso, and S. Peleg, "Computing occluding and transparent motions," Int'l J. Computer Vision, vol. 12, pp. 5-16, 1994.
M. Irani and P. Anandan, "A unified approach to moving object detection in 2D and 3D scenes," IEEE Transactions on Pattern Analysis and Machine Intelligence, vol. 20, No. 6, pp. 577-589, 1998.
N. Srinivasa et al., "Probabilistic inference devices for unconventional processing of signals for intelligent data exploitation," in Proc. GOMACTech 2015, Mar. 2015, pp. 1-31.
B.K. Horn and B.G. Schunck, "Determining optical flow," Artificial Intelligence, vol. 17, pp. 185-203, 1981.
X. Ren, "Local grouping for optical flow," in Proc. IEEE Conference on Computer Vision and Pattern Recognition (CVPR'08), 2008, pp. 1-8.
M.A. Fischler and R.C. Bolles, "Random sample consensus: a paradigm for model fitting with applications to image analysis and automated cartography," Communications of the ACM, vol. 24, No. 6, pp. 381-395, 1981.
del-Blanco, C. R., Jaureguizar, F., Salgado, L., & Garcia, N. (2008). Motion estimation through efficient matching of a reduced number of reliable singular points. In Electronic Imaging 2008, pp. 68110N 1-12.
Bruss, A. R., & Horn, B. K. (1983). Passive navigation. Computer Vision, Graphics, and Image Processing, 21(1), pp. 3-20.
Cheng, Y., Maimone, M., & Matthies, L. (2005). Visual odometry on the Mars exploration rovers. In IEEE International Conference on Systems, Man and Cybernetics, 2005, vol. 1, pp. 903-910.
Fischler, M. A., & Bolles, R. C. (1981). Random sample consensus: a paradigm for model fitting with applications to image analysis and automated cartography. Communications of the ACM, 24(6), pp. 381-395.
Horn, B. K., & Schunck, B. G. (1981). Determining optical flow. In 1981 Technical Symposium East International Society for Optics and Photonics, pp. 319-331.
Lucas, B. D., & Kanade, T. (1981). An iterative image registration technique with an application to stereo vision. In IJCAI, vol. 81, pp. 674-679.
Ren, X. (2008). Local grouping for optical flow. In IEEE Conference on Computer Vision and Pattern Recognition, 2008, CVPR'08, pp. 1-8.
Tian, T. Y., Tomasi, C., & Heeger, D. J. (1996). Comparison of approaches to egomotion computation. In IEEE Conference on Computer Vision and Pattern Recognition, 1996, CVPR'96, pp. 315-320.
Notification of Transmittal of International Search Report and the Written Opinion of the International Searching Authority for PCT/US2017/030673; dated Feb. 2, 2018.
International Search Report of the International Searching Authority for PCT/US2017/030673; dated Feb. 2, 2018.
Written Opinion of the International Searching Authority for PCT/US2017/030673; dated Feb. 2, 2018.

* cited by examiner

| | Error rate in number of shifts | Error in average distance to ground truth |
|---|---|---|
| Hybrid Valley Search | 0.0030 | 0.0209 |
| Hybrid Alternate Line Search | 0.0098 | 0.0908 |
| Projected Correlation | 0.0199 | 0.2944 |
| Lucas-Kanade | 0.0450 | 0.5050 |
| Lucas-Kanade w/ Gaussian Pyramid | 0.0336 | 0.3981 |

FIG. 6

EFFICIENT HYBRID METHOD FOR EGO-MOTION FROM VIDEOS CAPTURED USING AN AERIAL CAMERA

CROSS-REFERENCE TO RELATED APPLICATIONS

This is a Continuation-in-Part patent application of U.S. application Ser. No. 15/250,665, filed in the United States on Aug. 29, 2016, entitled, "A Fast Robust Method for Compensating Ego-Translations and Detecting Independent Moving Objects in Video Captured with a Moving Camera," which is a Non-Provisional patent application of U.S. Provisional Application No. 62/210,630, filed in the United States on Aug. 27, 2015, entitled, "A Fast and Robust Method for Compensating Ego-Translations and Detecting Independent Moving Objects in Video Captured with a Moving Camera," the entirety of which are hereby incorporated by reference.

This is ALSO a Non-Provisional patent application of U.S. Provisional Application No. 62/330,462, filed in the United States on May 2, 2016, entitled, "A Valley Search Method for Estimating Ego-Motion of a Camera from Videos," the entirety of which is hereby incorporated by reference.

This is ALSO a Non-Provisional patent application of U.S. Provisional Application No. 62/330,518, filed in the United States on May 2, 2016, entitled, "An Efficient Hybrid Method for Ego-Motion from Videos Captured Using an Aerial Camera," the entirety of which is hereby incorporated by reference.

This is ALSO a Non-Provisional patent application of U.S. Provisional Application No. 62/500,071, filed in the United States on May 2, 2017, entitled, "Method to Detect Moving Obstacles Based on Sensory Prediction from Egomotion," the entirety of which is hereby incorporated by reference.

STATEMENT REGARDING FEDERALLY SPONSORED RESEARCH OR DEVELOPMENT

This invention was made with government support under U.S. Government Contract Number HR0011-13-C-0052 UPSIDE issued by DARPA. The government has certain rights in the invention.

BACKGROUND OF INVENTION (1) Field of Invention

The present invention relates to a system for ego-motion compensation during video processing and, more particularly, to a system for ego-motion compensation during video processing which is accurate and computationally efficient.

(2) Description of Related Art

With the advent of modern computers, sensors and the internet, the amount of data being collected is far outpacing current capabilities of computing platforms to process them. This is further exacerbated for intelligence, reconnaissance and surveillance (ISR) applications where there is also a need for real-time processing of the large volume of data collected from computers on aerial vehicles, such as unmanned aerial vehicles (UAVs), helicopters and satellites to enable fast situational awareness and response capabilities. A key requirement for video processing from a moving platform (e.g., vehicle) is the need to compensate ego-motion of the platform in order to robustly detect all the independent moving objects in the scene. Prevalent methods of estimating the camera ego-motion from a video require feature detection and optical flow, where features are detected in the first frame, and then matched in the second frame (see, for example, Literature Reference Nos. 1-3 of the List of Incorporated Literature References). These methods are highly computation-intensive.

In U.S. Provisional Application No. 62/330,462, "A Valley Search Method for Estimating Ego-Motion of a Camera from Videos" (which is hereby incorporated by reference as though fully set forth herein), a fast and robust method to estimate ego-motion from videos taken by an aerial vehicle was disclosed. However, a continuing need exists for a method that combines a rough estimation of camera ego-motion with the valley search method to improve performance while saving computational cost.

SUMMARY OF INVENTION

The present invention relates to a system ego-motion compensation during video processing and, more particularly, to a system for ego-motion compensation during video processing which is accurate and computationally efficient. The system comprises one or more processors and a non-transitory computer-readable medium having executable instructions encoded thereon such that when executed, the one or more processors perform multiple operations. The system generates an initial estimate of camera ego-motion of a moving camera for consecutive image frame pairs of a video of a scene using a projected correlation method, wherein the camera is configured to capture the video from a moving platform. An optimal estimation of camera ego-motion is generated using the initial estimate as an input to one of a valley search method and an alternate line search method. Finally, independent moving objects are detected in the scene.

In another aspect, the detected independent moving objects are identified and tracked.

In another aspect, an estimate (h1,v1) of a last frame pair in the video is generated, and the optimal estimation (h*,v*) of camera ego-motion is generated using both the initial estimate (h0,v0) and (h1,v1) as input to the valley search method.

In another aspect, for each of consecutive image frame pairs I1 and I2, an X projection and a Y projection are determined. An ego-translation (h,v) of the camera is estimated by determining an optimal projection correlation of the consecutive image frame pairs I1 and I2 with image frame I2 shifted by (h,v) according to the following:

$$\min_{h} \Sigma_{1 < i, i+h < m} |X_i^{I1} - X_{i+h}^{I2}| \text{ and}$$

$$\min_{v} \Sigma_{1 < j, j+v < n} |Y_j^{I1} - Y_{j+v}^{I2}|,$$

where min denotes a minimization function, h denotes horizontal, v denotes vertical, n denotes a height of an image frame, m denotes a width of an image frame, i and j are index variables, $X_i^{I1}$ denotes an X projection for image frame I1, $X_{i+h}^{I2}$ denotes an X projection for image frame I2 shifted by h, $Y_j^{I1}$ denotes a Y projection for image frame I1, $Y_{j+v}^{I2}$ denotes a Y projection for image frame I2 shifted by v, and $\Sigma$ denotes a summation operation.

In another aspect, the moving platform is selected from a group consisting of an airplane, a helicopter, a satellite, and an unmanned aerial vehicle (UAV).

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for ego-motion compensation during video processing and, more particularly, to a system for ego-motion compensation during video processing which is accurate and computationally efficient. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. H. Badino and T. Kanade, "A Head-Wearable Short-Baseline Stereo System for the Simultaneous Estimation of Structure and Motion," in Proc. 12th IAPR Conference on Machine Vision Applications (MVA), June 2011.
2. Y. Cheng, M. Maimone, and L. Matthies, "Visual odometry on the Mars exploration rovers," in IEEE International Conference on Systems, Man and Cybernetics, vol. 1, pp. 903-910, 2005.
3. C. R. del-Blanco, F. Jaureguizar, L. Salgado, and N. Garcia, "Motion estimation through efficient matching of a reduced number of reliable singular points," in Proc. SPIE Electronic Imaging 2008, vol. 6811, pp. 68110N 1-12, 2008.
4. L. Itti, Neovision2 annotated video datasets. Taken on Apr. 12, 2017 from http://ilab.usc.edu/neo2/dataset/.
5. B. D. Lucas and T. Kanade, "An iterative image registration technique with an application to stereo vision," in Proc. 7$^{th}$ International Joint Conference on Artificial Intelligence (IJCAI), vol. 81, pp. 674-679, 1981.
6. S. Baker and I. Matthews, "Lucas-kanade 20 years on: A unifying framework," International Journal of Computer Vision, vol. 56, no. 3, pp. 221-255, 2004.
7. M. Irani, B. Rousso, and S. Peleg, "Computing occluding and transparent motions," Int'l J. Computer Vision, vol. 12, pp. 5-16, 1994.
8. M. Irani and P. Anandan, "A unified approach to moving object detection in 2D and 3D scenes," IEEE Transactions on Pattern Analysis and Machine Intelligence, vol. 20, no. 6, pp. 577-589, 1998.

(2) Principal Aspects

Various embodiments of the invention include three "principal" aspects. The first is a system ego-motion compensation during video processing. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
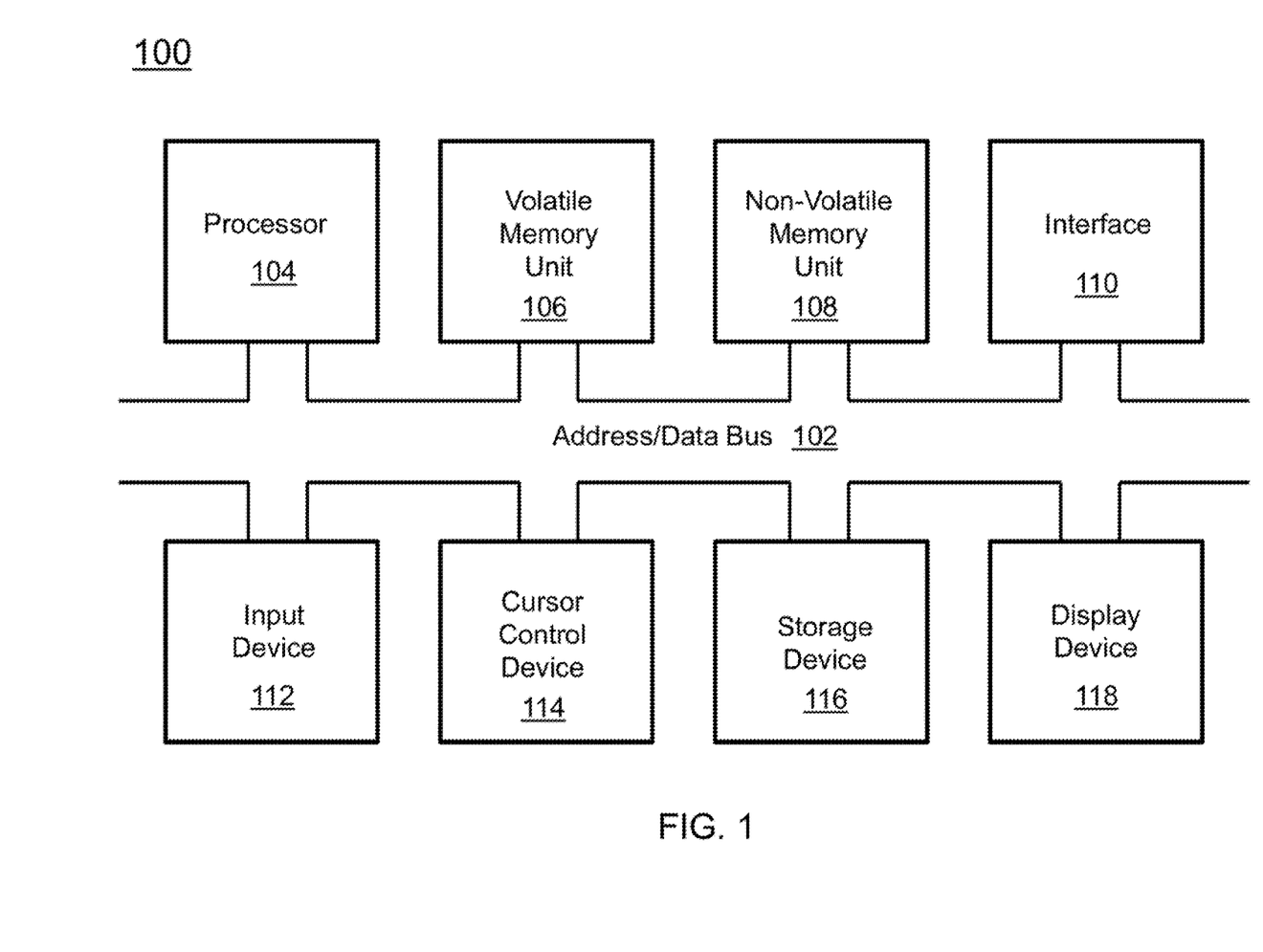
FIG. 1 is a block diagram depicting the components of a system for ego-motion compensation during video processing according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
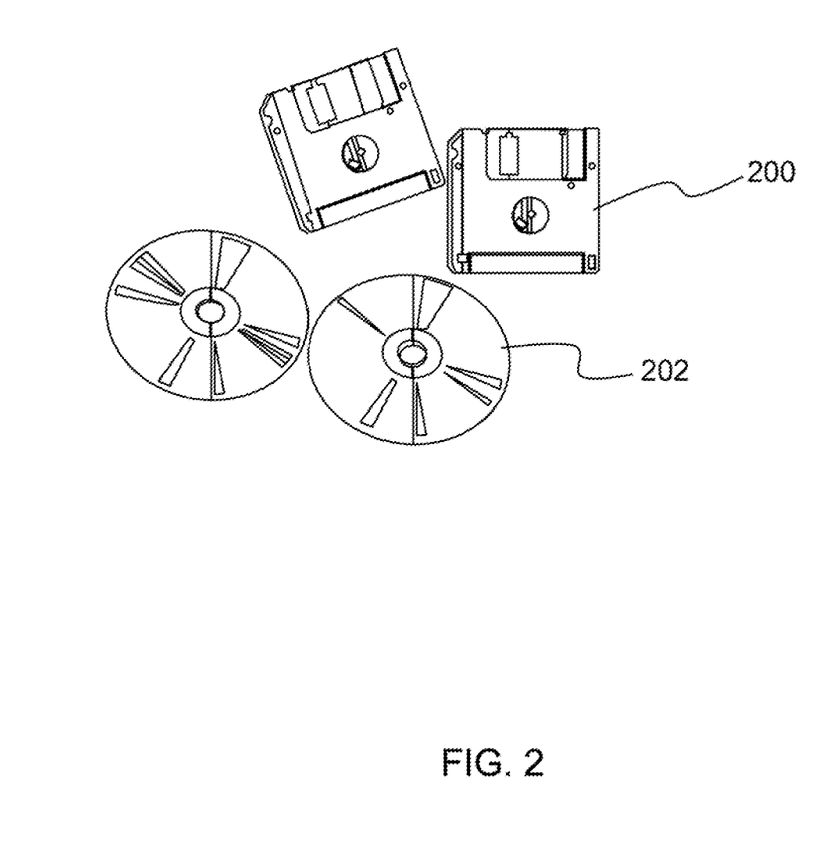
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described herein is a hybrid method for estimating ego-translation from videos taken by a moving camera, such as a camera positioned on a moving vehicle (e.g., helicopter, airplane). A key requirement for video processing is the need to compensate ego-motion of the vehicle in order to robustly detect all of the independent moving objects in the scene. The hybrid method according to embodiments of this disclosure first uses a projected correlation method to get an initial rough estimation of the camera ego-motion, then starts using a valley search method to get a final accurate estimation of the ego-motion. As described below, the hybrid method has superior performance over existing technologies while saving computational cost.

(3.1) Projected Correlation Method

Given an image $I_{ij}$ of size m×n, its X projection is a vector $X^I$ defined by:

$$X_i^I = \Sigma_{j=1}^n I_{ij}. \qquad (1)$$

Similarly, its Y projection is a vector $Y^I$ defined by:

$$Y_j^I = \Sigma_{i=1}^m I_{ij}. \qquad (2)$$

Figure 3:
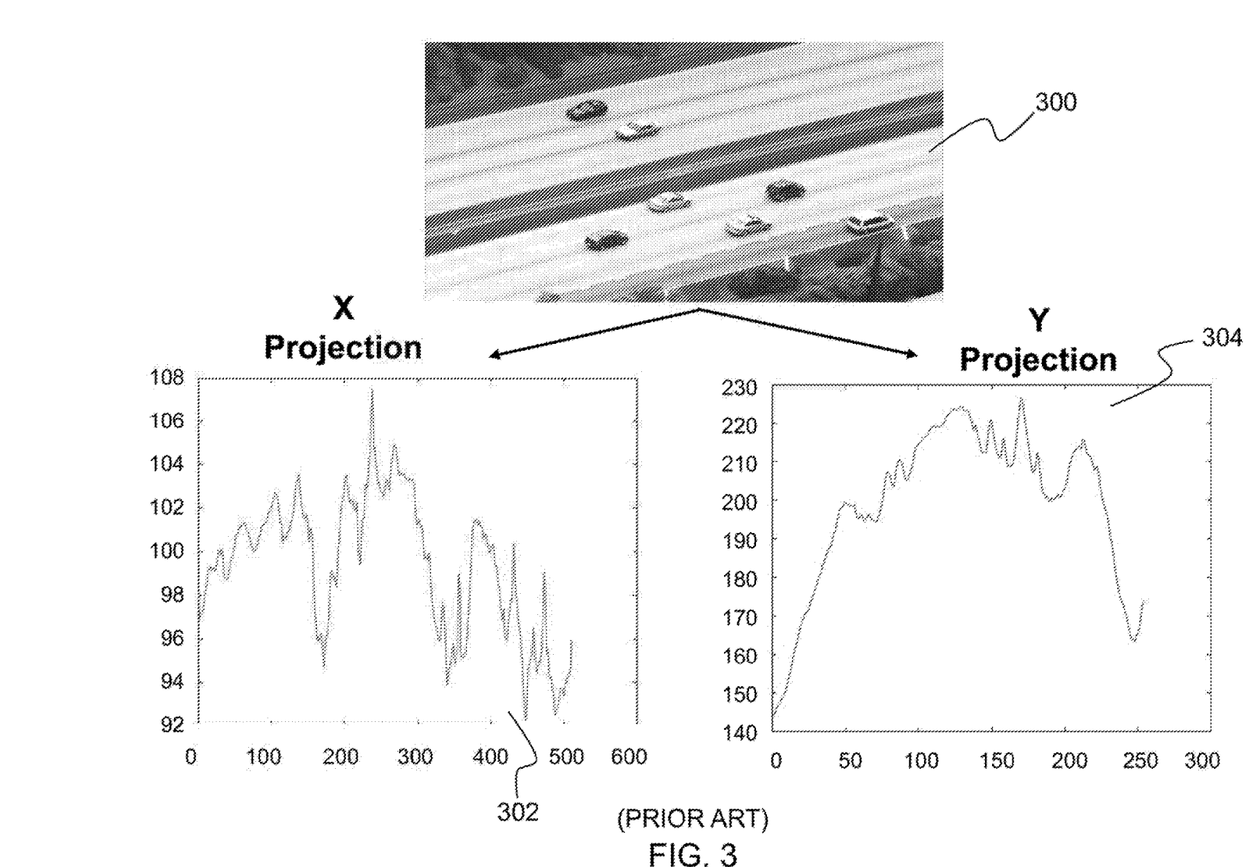
FIG. 3 is an illustration of X and Y projections of a projected correlation method according to prior art.

FIG. 3 illustrates an example image 300, a plot corresponding to an X projection 302 of the image, and a plot corresponding to a Y projection 304. Let I1 and I2 be two consecutive frames in a video taken by a moving camera. The projected correlation method estimates the camera ego-translation (h,v) by finding the best projection correlation of I1 and I2, with image I2 shifted by (h,v). The method described herein can be defined by finding the optimal (h,v) that minimizes the differences of the projections between I1 and I2, with image I2 shifted by (h,v):

$$\min_h \Sigma_{1 \leq i, i+h \leq m} |X_i^{I1} - X_{i+h}^{I2}| \qquad (3)$$

$$\min_v \Sigma_{1 \leq j, j+v \leq n} |Y_j^{I1} - Y_{j+v}^{I2}|, \qquad (4)$$

where min denotes a minimization function, h denotes horizontal, v denotes vertical, n denotes a height of an image frame, m denotes a width of an image frame, i and j are index variables, $X_i^{I1}$ denotes an X projection for image frame I1, $X_{i+h}^{I2}$ denotes an X projection for image frame I2 shifted by h, $Y_j^{I1}$ denotes a Y projection for image frame I1, $Y_{j+v}^{I2}$ denotes a Y projection for image frame I2 shifted by v, and Σ denotes a summation operation. Only valid inside values for indexes i and j are utilized to avoid boundary effect.

(3.2) Valley Search Method

As detailed in U.S. Provisional Application No. 62/330,462, the valley search method performs a line search along a valley direction where local minima are often distributed. This can be implemented by first locating two local minima, and then search along the direction defined by the two local minima. The two local minima can be found using an optimization method (e.g., the alternate line search method) by starting from two initial points that are sufficiently far from each other. More precisely, the algorithm is described as follows.

1. Starting from an initial point $(h_0, v_0)$, use the alternate line search method (described below) to get an ego-translation estimate $(h_1, v_1)$.
2. Pick up another initial point $(h'_0, v'_0)$ that is sufficiently far from $(h_0, v_0)$. For example, a sufficient offset from $(h_1, v_1)$ such as $h'_0 = h_1$ and $v'_0 = v_1 + 5$. Then, starting from the initial point $(h'_0, v'_0)$, use the alternate line search method (or another egomotion estimation method) to get another ego-translation estimate $(h_2, v_2)$.
3. If $(h_2, v_2) = (h_1, v_1)$, stop and return $(h_2, v_2)$ as the optimal solution. Otherwise, find the smaller value between $f(h_1, v_1)$ and $f(h_2, v_2)$, where $f$ is the cost function defined by $f(h,v) = \Sigma_{ij} |I'(i+h, j+v) - I(i,j)|$. Here |·| is the absolute value, and (i,j) are valid positions (overlapping region of translated image and original image). In other words, the problem solved is $\min_{h,v} \Sigma_{ij} |I'(i+h, j+v) - I(i,j)|$. Let I and I' represent two consecutive frames in a video with planar ego-translations. In the ideal case, there are fixed translations h and v such that $I'(i+h, j+v) = I(i,j)$ for any position (i,j). Now assume $(h_2, v_2)$ is the smaller solution. Swap $(h_1, v_1)$ and $(h_2, v_2)$ otherwise.
4. Repeat until $h_2 = h_1$ and $v_2 = v_1$
   a. Let $r = (h_2 - h_1, v_2 - v_1)$, and $x_0 = (h_1, v_1)$. Define $d(u) = f(x_0 + ru)$.
   b. Perform a line search to function d such that $\alpha = \text{linesearch}(d, \Delta, \varepsilon_1)$. Here linesearch is the algorithm defined in U.S. Provisional Application No. 62/330,462 with $\Delta = 1$ and $$\varepsilon_1 = \min\left(\left|\frac{1}{h_2 h_1}\right|, \left|\frac{1}{v_2 v_1}\right|\right).$$

c. Let $(h,v) = \text{round}(x_0 + r\alpha)$, where round function rounds its arguments to the nearest whole numbers. Then, starting from (h,v), use the alternate line search method (or other optimization method) to get an ego-translation estimate (h',v').
   d. Reset $(h_1, v_1) = (h_2, v_2)$ and $(h_2, v_2) = (h', v')$.
5. Return $(h_2, v_2)$ as the optimal solution.

(3.3) Hybrid Method

Described below are the hybrid valley search method and its simplified version hybrid alternate line search method according to embodiments of the present disclosure.

(3.3.1) Hybrid Valley Search Method

Figure 4:
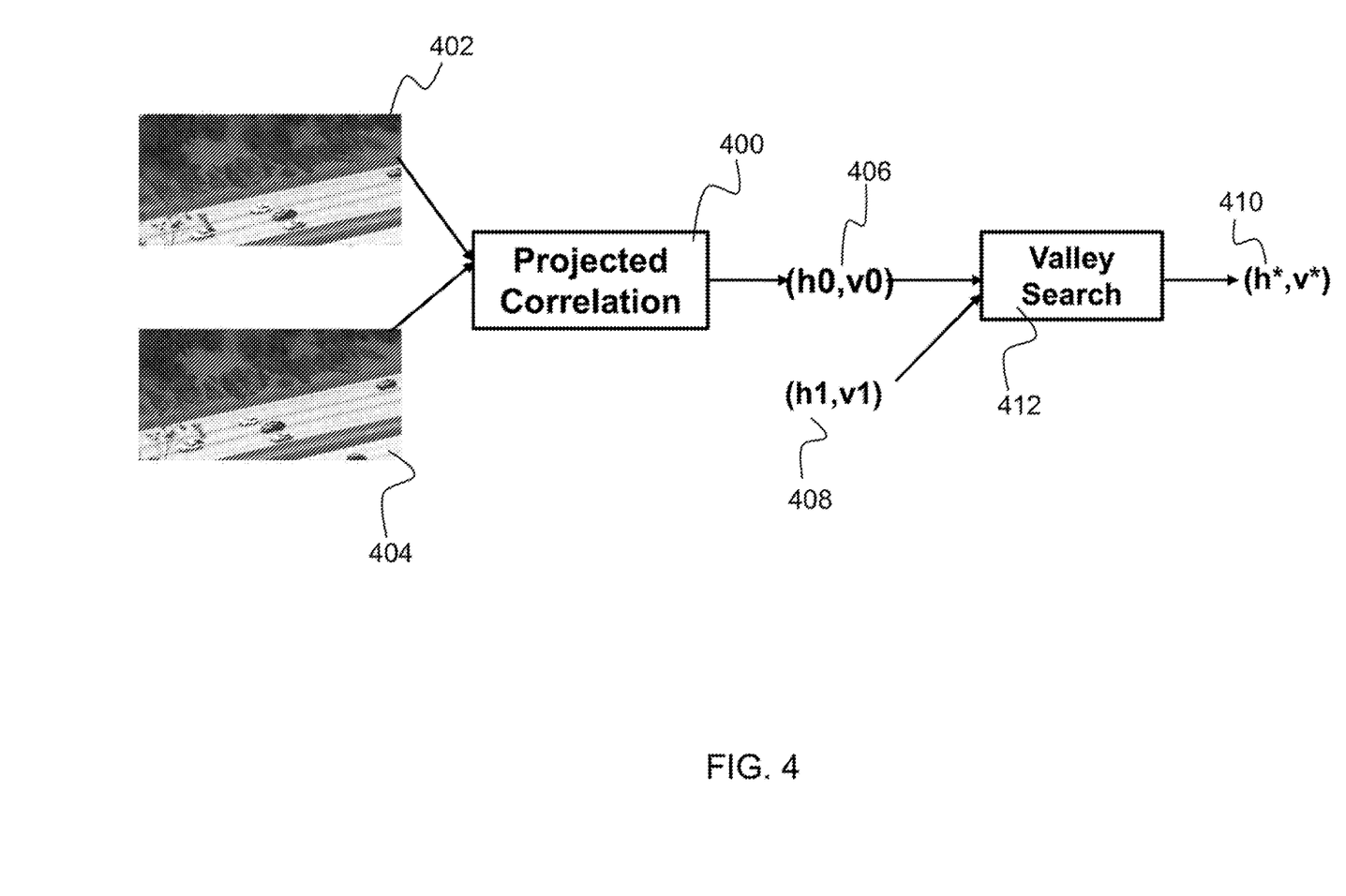
FIG. 4 is a flow diagram illustrating the hybrid valley search method according to some embodiments of the present disclosure.

The original valley search method (as described in U.S. Provisional Application No. 62/330,462) starts its search from two initial guesses. The first initial guess is the estimate of the last image frame pair in a video ((0,0) for the first frame pair). The second initial guess is an offset of the first initial guess. In the hybrid valley search method described herein (and depicted in FIG. 4), one of the initial guesses is the estimate from the projected correlation 400 of two consecutive frames in a video taken by a moving camera (elements 402 and 404), while the other initial guess is still the estimate of the last frame pair in a video ((0,0) for the first frame pair). (h0,v0) 406 is the shift estimate from the projected correlation method (element 400). (h1,v1) 408 is the ego-motion estimate of the last frame pair in a video ((0,0) for the first frame pair). For the first frame of the video (h1,v1) is initialized to (0,0). (h*,v*) 410 is the final optimal estimate. (h0,v0) 406 and (h1,v1) 408, therefore, are the two initial guesses which are used in the valley search method 412 to determine the final optimal estimate (h*,v*) 410.

(3.3.2) Hybrid Alternate Line Search Method

The hybrid alternate line search method is a simplified version of the hybrid valley search method described above. It saves about two-thirds of the computational cost with a trade-off in accuracy. It combines the alternate line search method and the projected correlation method.

The alternate line search method was introduced in U.S. application Ser. No. 15/250,665, entitled, "A Fast Robust Method for Compensating Ego-Translations and Detecting Independent Moving Objects in Video Captured with a Moving Camera," which is hereby incorporated by reference as though fully set forth herein. The alternate line search method minimizes a cost function that is based on the difference between consecutive image frames. As a result, no expensive feature matching and optical flow computations are needed. The method is so fast and efficient that normally it takes no more than two search steps to reach the global minimum. In total, it takes around only 8 frame-difference operations to find the correct ego-translation in a video frame.

The alternate line search method operates as follows. Let I and I' be two consecutive frames in a video with ego-translations. In the ideal case, there are fixed translations h and v such that I'(i+h,j+v)=I(i,j) for any position (i,j). However, in practice, it rarely occurs due to independent object movement, three-dimensional (3D) projection and noise, etc. Instead, the optimal translation (h,v) is found by minimizing the function:

$$f(h,v)=\Sigma_{ij}|I'(i+h,j+v)-I(i,j)|. \quad (5)$$

In other words, $$\min_{h,v} \Sigma_{ij}|I'(i+h,j+v)-I(i,j)|. \quad (6)$$

Fortunately, the function $f(h,v)$ is usually a convex function with a global minimum or, in worse cases, a quasi-convex function with a deep global minimum and some shallow local minima. While a gradient descent method can be used here to find the minimum of a convex function, it is susceptible to a zig-zagging problem during search, thus, requiring many steps to reach the minimum. To address this, a method was developed to find the minimum of function $f(h,v)$. On average, it takes no more than three steps to find the global minimum from an arbitrary initial point.

Figure 5:
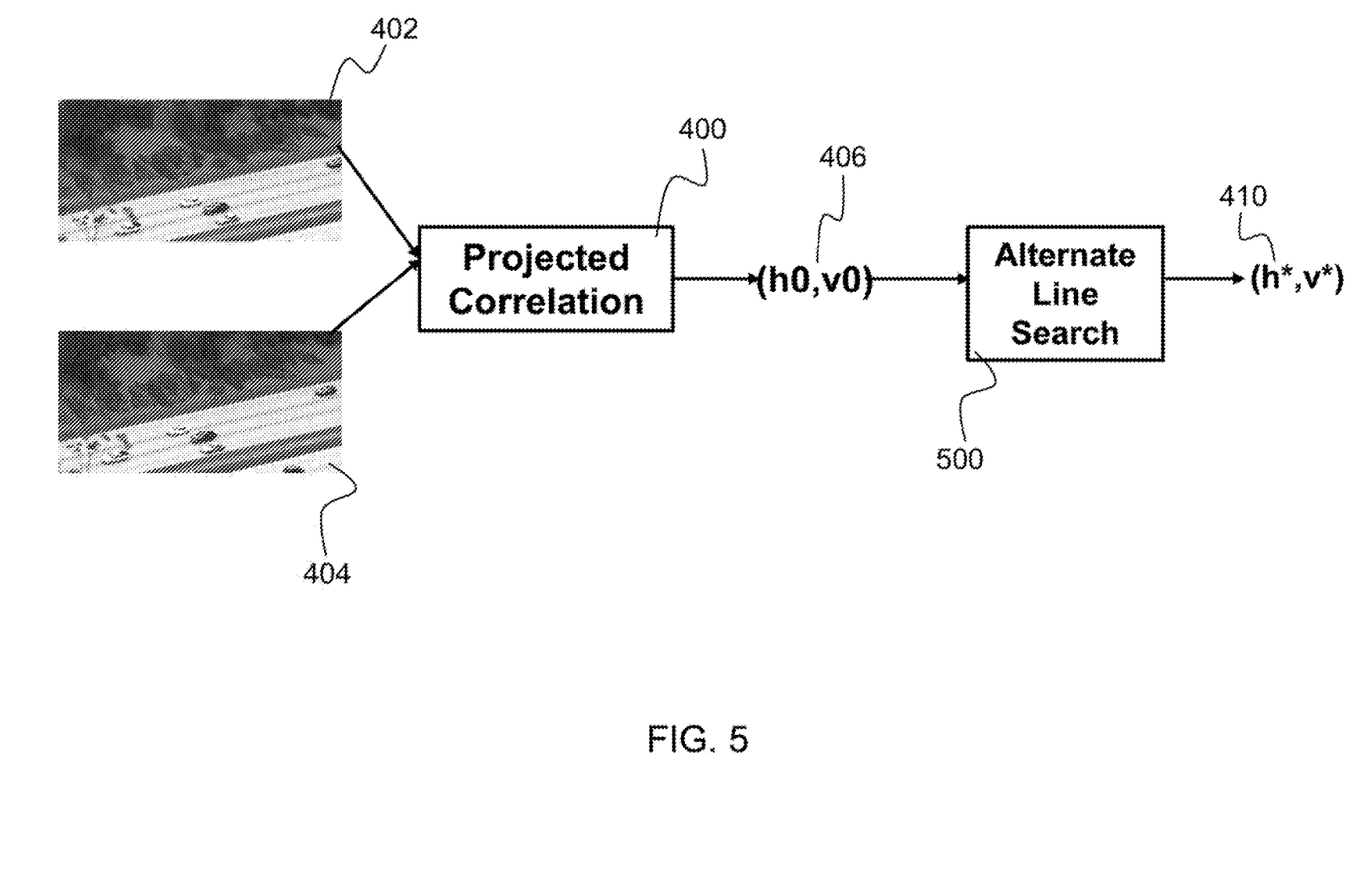
FIG. 5 is a flow diagram illustrating the hybrid alternate line search method according to some embodiments of the present disclosure.

The alternate line search algorithm consists of alternative one directional search (horizontal or vertical). Starting from an initial point, it goes as far as possible in the horizontal (or vertical) direction until reaching the minimum in that direction. Then, starting from there, it goes as far as possible in the other direction. The process can be repeated until a global minimum (h*,v*) (element 410) is reached. For example, for an elliptic paraboloid, it takes only two steps to reach the global minimum starting from any initial point.

Mathematically, let $(h_0,v_0)$ be the initial point. The algorithm then proceeds as follows.

1. Find $h_1$ such that $\min_h f(h,v_0)$ at $h=h_1$.
2. Find $v_1$ such that $\min_v f(h_1,v)$ at $v=v_1$.
3. Let $\Delta h=|h_1-h_0|$, $\Delta v=|v_1-v_0|$, then reset $h_0:=h_1$ and $v_0:=v_1$.
4. Repeat steps 1-3 until $\Delta h$ and $\Delta v$ are zeros (or small enough depending on the resolution of the image (e.g., a threshold of 3 pixels)).

The directional search method used in the above algorithm (Steps 1 and 2) is as follows, using horizontal directional search as an example (vertical directional search is similar). Let $g(h)=f(h+h_0,v_0)$, where $(h_0,v_0)$ is the initial position.

1. Determine the search direction side (left or right). It can be done by choosing the smallest among $g(\Delta h)$, $g(-\Delta h)$ and $g(0)$, with $\Delta h$ being a small number (e.g., 1 or 2). Let h<0 denote left and h>0 denote right. If g(0) is the smallest, then stop and return h=0. Otherwise, let d(h) be g(h) (if $g(\Delta h)$ is the smallest) or g(-h) (if $g(-\Delta h)$ is the smallest).
2. Initialize L, B, and H such that $d(B) \leq d(L)$ and $d(B) \leq d(H)$, where d is the objective function to evaluate h steps in the direction of the line search. L is the lower bound of the line search, H is the higher bound of the line search, and B is the test point in the middle that gets iteratively updated and will, at the end of the line search, be the argument that minimums the objection function d( ). This can be done as follows. Let L=0, B=$\Delta h$, and H=2B. Repeat the following step until $d(B) \leq d(H)$:
   2.1. Reset B:=H and H:=2B
3. If H−L>2, then repeat:
   3.1. Let $$L' = \frac{L+B}{2}, H' = \frac{H+B}{2}.$$

3.2. If d(L')<d(B), then reset H:=B, and B:=L'.
   3.3. If d(H')<d(B), then reset L:=B, and B:=H'.
   3.4. Otherwise, reset L:=L', and H:=H'.
4. Return h=B as the optimal directional search result.

As shown in FIG. 5, the hybrid alternate line search method first uses the projected correlation method (element 400) to get an initial estimate of camera ego-translation for two consecutive image frames (elements 402 and 404), then uses the alternate line search method (element 500) to get the final optimal estimate (h*,v*) 410. (h0,v0) 406 is the shift estimate from the projected correlation method.

(3.4) Experimental Studies

The hybrid methods described above were tested on Defense Advanced Research Projects Agency (DARPA) helicopter videos (see Literature Reference No. 5). Each of the hybrid methods described above have superior performance compared to existing methods. By testing on the Helicopter training dataset of 50 video sequences (about 25,000 total frames) (see Literature Reference No. 5), the error rate for the hybrid valley search method is only 0.003. The error rate for the hybrid alternate line search method is about 0.01, while saving more computational cost. For instance, on average, the hybrid alternate line search method uses about 8 image difference operations to reach the optimal solution, while the hybrid valley search method uses about 21 image difference operations to reach the optimal solution.

Figure 6:
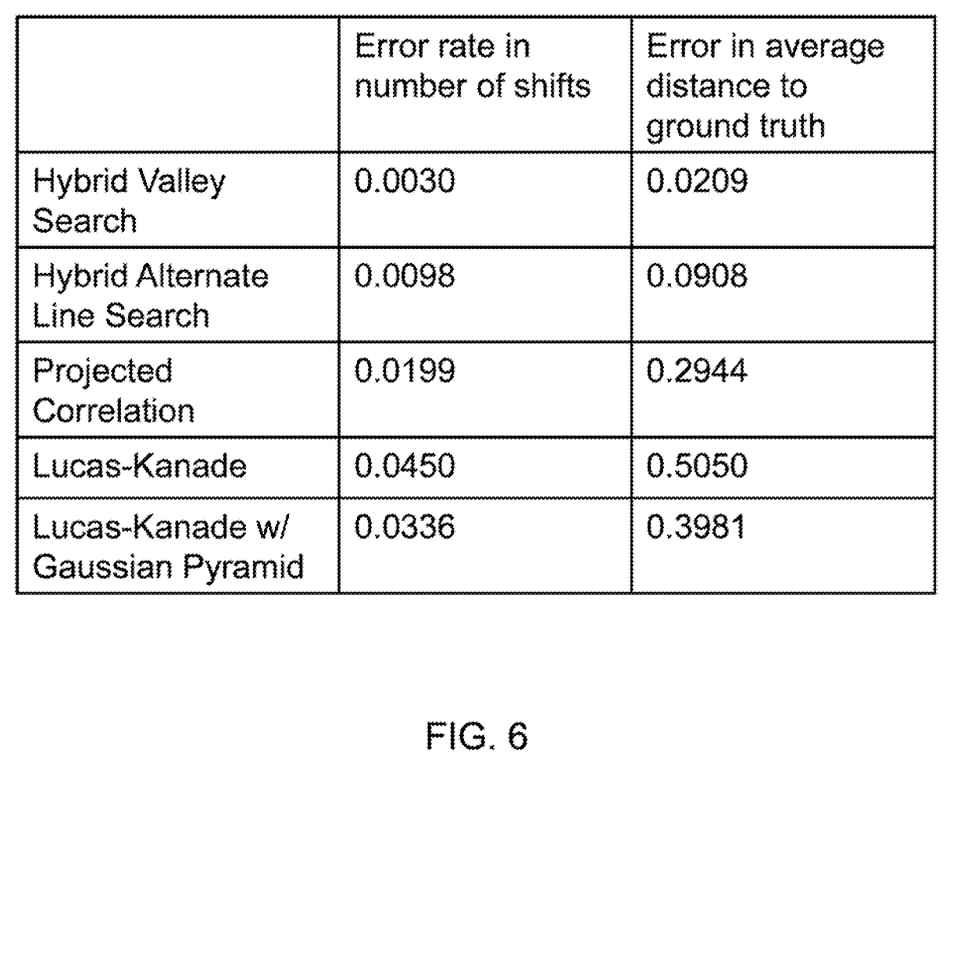
FIG. 6 is a table illustrating a comparison of ego-motion estimation on helicopter sequences according to some embodiments of the present disclosure.

The methods according to embodiments of the present disclosure were also compared with other ego-motion methods, such as the Lucas-Kanade method (see Literature References Nos. 6 and 7) and the Lucas-Kanade method with Gaussian Pyramid (see Literature Reference Nos. 8 and 9). The table in FIG. 6 depicts a detailed comparison of the various methods, where the error rate in number of shifts is the number of estimate errors in horizontal or vertical shifts (translations) divided by the total number of horizontal and vertical shifts for all frames. Note that there are two shifts (one horizontal and one vertical) for each frame pair. If the estimate is deviated from ground truth over one pixel, it is considered that an estimate error occurred. The error in average distance to ground truth is the sum of deviates in distance from ground truth for all frames divided by the total number of shifts. The table in FIG. 6 shows that the hybrid valley search method according to the embodiments of this disclosure has the best accuracy with the hybrid alternate line search method next to it.

Many image processing and object recognition algorithms assume that a scene is stationary in order to find objects of interest. By performing ego-motion compensation, one can essentially remove the camera motion from the video and only be left with the objects that are moving independently from the camera. This has broad applications in wide area surveillance and for monitoring traffic on low power platforms, such as drones. The invention will have a wide range of applications in image and video processing where an ego-motion compensation is needed, such as on a helicopter, unmanned aerial vehicle (UAV), and satellite videos. After detection, objects in a wide area scene can be identified (using an object recognition algorithm) and tracked (using an object tracking algorithm). Due to its computational efficiency, the method is amenable for implementation in hardware with ultra-low power consumption.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for ego-motion compensation during video processing, one or more processors and a non-transitory computer-readable medium having executable instructions encoded thereon such that when executed, the one or more processors perform operations of:
   generating an initial estimate of camera ego-motion of a moving camera for consecutive image frame pairs of a video of a scene using a projected correlation method, wherein the camera is configured to capture the video from a moving platform;
   generating an optimal estimation of camera ego-motion using the initial estimate as an input to one of a valley search method and an alternate line search method; and
   detecting independent moving objects in the scene.

2. The system as set forth in claim 1, wherein the one or more processors further performs operations of identifying and tracking the detected independent moving objects.

3. The system as set forth in claim 1, wherein the one or more processors further perform operations of:
   generating an ego-motion estimate (h1,v1) of a last frame pair in the video; and
   generating the optimal estimation (h*,v*) of camera ego-motion using both the initial estimate (h0,v0) and (h1,v1) as input to the valley search method.

4. The system as set forth in claim 1, wherein the one or more processors further perform operations of:
   for each of consecutive image frame pairs I1 and I2, determining an X projection and a Y projection;
   estimating an ego-translation (h,v) of the camera by determining an optimal projection correlation of the consecutive image frame pairs I1 and I2 with image frame I2 shifted by (h,v) according to the following:

$$\min_{h} \Sigma_{1<i,i+h<m} |X_i^{I1} - X_{i+h}^{I2}| \text{ and}$$

$$\min_{v} \Sigma_{1<j,j+v<n} |Y_j^{I1} - Y_{j+v}^{I2}|,$$

where min denotes a minimization function, h denotes horizontal, v denotes vertical, n denotes a height of an image frame, m denotes a width of an image frame, i and j are index variables, $X_i^{I1}$ denotes an X projection for image frame I1, $X_{i+h}^{I2}$ denotes an X projection for image frame I2 shifted by h, $Y_j^{I1}$ denotes a Y projection for image frame I1, $Y_{j+v}^{I2}$ denotes a Y projection for image frame I2 shifted by v, and Σ denotes a summation operation.

5. The system as set forth in claim 1, wherein the moving platform is selected from a group consisting of an airplane, a helicopter, a satellite, and an unmanned aerial vehicle (UAV).

6. A computer implemented method for ego-motion compensation, the method comprising an act of:
   causing one or more processors to execute instructions encoded on a non-transitory computer-readable medium, such that upon execution, the one or more processors perform operations of:
   generating an initial estimate of camera ego-motion of a moving camera for consecutive image frame pairs of a video of a scene using a projected correlation method, wherein the camera is configured to capture the video from a moving platform;
   generating an optimal estimation of camera ego-motion using the initial estimate as an input to one of a valley search method and an alternate line search method; and
   detecting independent moving objects in the scene.

7. The method as set forth in claim 6, wherein the one or more processors further performs operations of identifying and tracking the detected independent moving objects.

8. The method as set forth in claim 6, wherein the one or more processors further perform operations of:
   generating an ego-motion estimate (h1,v1) of a last frame pair in the video; and
   generating the optimal estimation (h*,v*) of camera ego-motion using both the initial estimate (h0,v0) and (h1,v1) as input to the valley search method.

9. The method as set forth in claim 6, wherein the one or more processors further perform operations of
   for each of consecutive image frame pairs I1 and I2, determining an X projection and a Y projection;
   estimating an ego-translation (h,v) of the camera by determining an optimal projection correlation of the consecutive image frame pairs I1 and I2 with image frame I2 shifted by (h,v) according to the following:

$$\min_{h} \Sigma_{1<i,i+h<m} |X_i^{I1} - X_{i+h}^{I2}| \text{ and}$$

$$\min_{v} \Sigma_{1<j,j+v<n} |Y_j^{I1} - Y_{j+v}^{I2}|,$$

where min denotes a minimization function, h denotes horizontal, v denotes vertical, n denotes a height of an image frame, m denotes a width of an image frame, i and j are index variables, $X_i^{I1}$ denotes an X projection for image frame I1, $X_{i+h}^{I2}$ denotes an X projection for image frame I2 shifted by h, $Y_j^{I1}$ denotes a Y projection for image frame I1, $Y_{j+v}^{I2}$ denotes a Y projection for image frame I2 shifted by v, and Σ denotes a summation operation.

10. The method as set forth in claim 6, wherein the moving platform is selected from a group consisting of an airplane, a helicopter, a satellite, and an unmanned aerial vehicle (UAV).

11. A computer program product for ego-motion compensation, the computer program product comprising:
    computer-readable instructions stored on a non-transitory computer-readable medium that are executable by a computer having one or more processors for causing the processor to perform operations of:

generating an initial estimate of camera ego-motion of a moving camera for consecutive image frame pairs of a video of a scene using a projected correlation method, wherein the camera is configured to capture the video from a moving platform;

generating an optimal estimation of camera ego-motion using the initial estimate as an input to one of a valley search method and an alternate line search method; and detecting independent moving objects in the scene.

12. The computer program product as set forth in claim 11, further comprising instructions for causing the one or more processors to further perform operations of identifying and tracking the detected independent moving objects.

13. The computer program product as set forth in claim 11, further comprising instructions for causing the one or more processors to perform operations of:

generating an ego-motion estimate (h1,v1) of a last frame pair in the video; and generating the optimal estimation (h*,v*) of camera ego-motion using both the initial estimate (h0,v0) and (h1,v1) as input to the valley search method.

14. The computer program product as set forth in claim 11, further comprising instructions for causing the one or more processors to further perform operations of:

for each of consecutive image frame pairs I1 and I2, determining an X projection and a Y projection;

estimating an ego-translation (h,v) of the camera by determining an optimal projection correlation of the consecutive image frame pairs I1 and I2 with image frame I2 shifted by (h,v) according to the following:

$$\min_{h} \Sigma_{1<i, i+h<m} |X_i^{I1} - X_{i+h}^{I2}| \text{ and}$$

$$\min_{v} \Sigma_{1<j, j+v<n} |Y_j^{I1} - Y_{j+v}^{I2}|,$$

where min denotes a minimization function, h denotes horizontal, v denotes vertical, n denotes a height of an image frame, m denotes a width of an image frame, i and j are index variables, $X_i^{I1}$ denotes an X projection for image frame I1, $X_{i+h}^{I2}$ denotes an X projection for image frame I2 shifted by h, $Y_j^{I1}$ denotes a Y projection for image frame I1, $Y_{j+v}^{I2}$ denotes a Y projection for image frame I2 shifted by v, and $\Sigma$ denotes a summation operation.

15. The computer program product as set forth in claim 11, wherein the moving platform is selected from a group consisting of an airplane, a helicopter, a satellite, and an unmanned aerial vehicle (UAV).

* * * * *